United States Patent [19]

Huang

[11] Patent Number: 4,779,457
[45] Date of Patent: Oct. 25, 1988

[54] PRESSURE GAUGE

[76] Inventor: Tien-Tsai Huang, No. 4, Lane 30, Wu-Chuan St., Panchiao City, Taiwan

[21] Appl. No.: 101,664

[22] Filed: Sep. 28, 1987

[51] Int. Cl.$^4$ .................... B60C 23/02; G01L 7/16
[52] U.S. Cl. .................................. 73/146.8; 73/744; 116/34 R
[58] Field of Search ............... 73/146.8, 146.3, 744; 116/34 R, 272, 266, DIG. 47

[56] References Cited

U.S. PATENT DOCUMENTS

| | | | |
|---|---|---|---|
| 1,079,965 | 12/1913 | Waters | 73/744 |
| 1,602,822 | 10/1926 | Kraft | 73/744 |
| 1,850,541 | 3/1932 | Farley | 73/744 |

Primary Examiner—Donald O. Woodiel
Attorney, Agent, or Firm—Cushman, Darby & Cushman

[57] ABSTRACT

This invention discloses an improved pressure gauge adaptable to simultaneously indicate multi-linear scale of the tire pressure. This pressure gauge has a tubular member having a first and a second end, a tire valve engaging head attached to the first end of the tubular member, and a compression spring having a first and a second end. A piston provided movably at the first end of the compression spring and a frame. The frame has a substantially U-shaped configuration with a transverse portion interconnecting two opposed leg portions, each of the leg portions having an inner and an outer side wall. The inner side walls of the leg portion are each provided with two guide slots formed longitudinally therein which extend in parallel to each other. In addition this pressure gauge includes at least two graduated bars each having a front and a reverse side wall which have different linear scales printed thereof, and two side walls each having two side edges provided therealong in parallel to each other for movement with respect to the longitudinal guide slots, and being in contact with the piston. The graduated bar is substantially cruliform-shaped. A cover with an opening frictionally engages the graduated bar and fits into the second end of the tubular member.

3 Claims, 2 Drawing Sheets

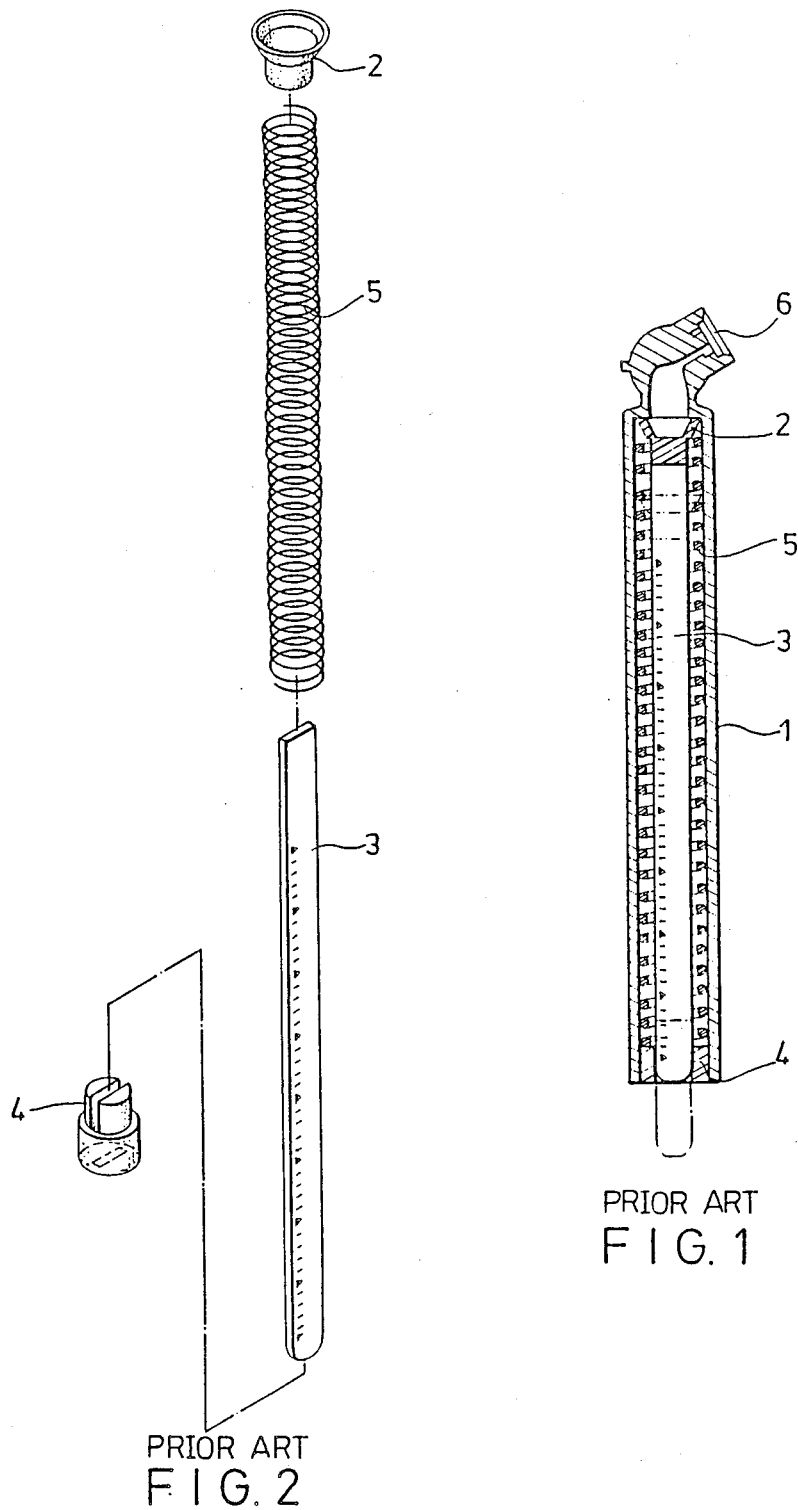
PRIOR ART
FIG. 1
PRIOR ART
FIG. 2

U.S. Patent   Oct. 25, 1988   Sheet 2 of 2   4,779,457
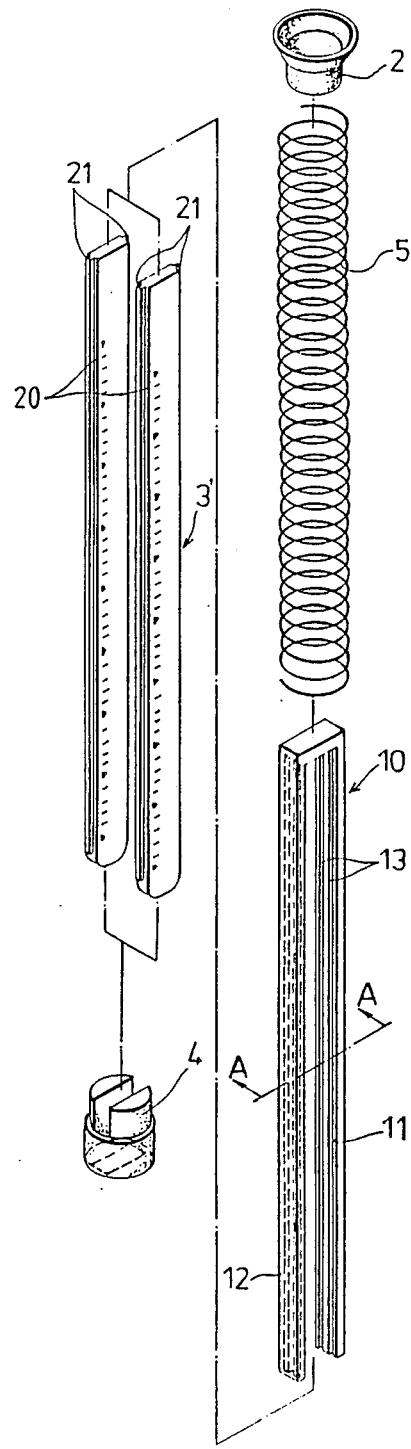
FIG. 4
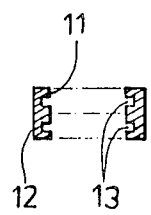
FIG. 5
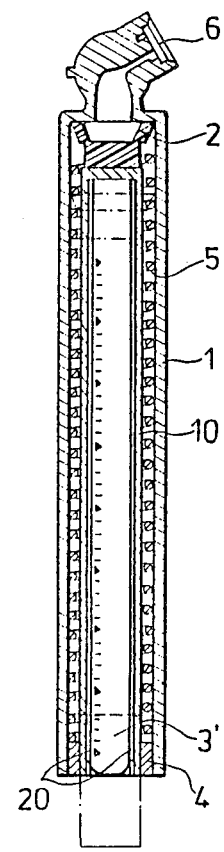
FIG. 3

PRESSURE GAUGE

BACKGROUND OF THE INVENTION

This invention relates to a improved pressure gauge and more particularly to a pressure gauge adaptable to simultaneously indicate multi-linear scale readings of tire pressure.

In the known pressure gauge there exists an inherent problem in that it can only be used to indicate one linear scale of tire pressure, such as LBS/in2, KPA, BAR or Kg/cm2, at a time.

The above-mentioned limitation presents another problem with regard to the production of the pressure gauge. Since only one linear scale readings is provided, the gauge must be produced a multiple number of times to satisfy the different measurement standards of the country for which it is being manufactured. As a result, optimum conditions for cost efficient mass production of the pressure gauge can not be achieved.

The conventional pressure gauge as shown in FIGS. 1 and 2 includes a tubular member with a hollow interior and a first and a second end. The pressure gauge also includes a tire valve engaging head attached to the first end of the tubular member and a compression spring having a first and a second end. The compression spring is located within the tubular member. Also provided on the pressure gauge are a piston movably at the first end of the compression spring, a graduated bar means movably within the compression spring, and a cover means with an opening frictionally engaging the graduated bar means and fitting into the second end of the tubular member.

SUMMARY OF THE INVENTION

It is, therefore, the main object of this invention to provide an improved pressure gauge adaptable to simultaneously indicate multi-linear scale readings of tire pressure.

BRIEF DESCRIPTION OF THE DRAWINGS

This and other objects of this invention will be more fully understood from the following detailed description of a preferred embodiment when read in conjunction with the accompanying drawings, in which:

FIG. 1 shows a perspective view of a conventional pressure gauge;

FIG. 2 is a perspective view showing the assembly of the conventional pressure gauge;

FIG. 3 is a cross-sectional view of the preferred embodiment according to this invention.

FIG. 4 is a perspective view illustrating the assembly of this invention; and

FIG. 5 is a cross-sectional view showing the frame of the pressure gauge taken along line A—A.

DESCRIPTION OF THE INVENTION

The preferred embodiment of this invention will be described with reference to FIGS. 3 to 5.

As illustrated in FIGS. 3 and 4, this pressure gauge has a tubular member 1 having a first and a second end, a tire valve engaging head 6 attached to the first end of the tubular member 1, and a compression spring 5 having a first and a second end. Also included in this pressure gauge are a piston 2 provided movably at the first end of the compression spring 5 and a frame 10. The frame has a substantially U-shaped configuration with a transverse portion interconnecting two opposed leg portions, each of the leg portions having an inner and an outer side wall 11 and 12. The inner side walls 11 of the leg portions are each provided with two guide slots 13 formed longitudinally therein which extend in parallel to each other. In addition this pressure gauge includes at least two graduated bar means 3' each having a front and a reverse side wall which have different linear scales printed thereon, and two side edges 20 each having two longitudinal opposed ridges 21 provided therealong in parallel to each other for movement within the longitudinal guide slots 13, and being in contact with the piston 2. The graduated bar means 3' is substantially cruciform-shaped. A cover means 4 with an opening frictionally engages the graduated bar means 3' and fits into the second end of the tubular member 1.

Referring to FIG. 5, the cross-sectional view of the frame 10 illustrates how the longitudinal guide slots 13 are formed in parallel on each of the opposing leg portions.

The operation of this invention is described in detail as follows.

The compression spring 5 functions to sense the tire pressure from the piston 2 when a pressure is within the tire valve engaging head 6 during operation thereof. The piston 2 is shifted by the pressure from the tire, and brings the frame 10 against the action of compression spring 5, thus both toward the second end of the tubular member 1 to show the pressure out of the cover means 4 in accordance with the amount of air pressure acting on the piston 2 to reflect on the linear scale of the graduated bar means 3'.

It will be understood that other variations on the described forms of this invention will readily occur to those skilled in the art. It is therefore intended that this invention is to be limited only as indicated in the appended claims.

What is claimed is:

1. A pressure gauge comprising:
   a tubular member with a hollow interior, said tubular member having a first and a second end;
   a tire valve engaging head attached to the first end of the tubular member;
   a compression spring having a first and a second end, said compression spring located within the tubular member;
   a piston provided movably at the first end of the compression spring;
   a cover member provided at the second end of the tubular member, said cover member having an opening;
   a frame provided movably within the compression spring, said frame having a transverse portion interconnecting two opposed leg portions, each of the leg portions having an inner and an outer side wall, the inner side walls of the side leg portions each being provided with guide slots formed longitudinally therein which extend in parallel to each other; and
   at least two graduated bar means provided within the frame and movably within the compression spring, said graduated bar means each having two side edges each provided therealong in parallel to each other for movement with respect to the longitudinal guide slots, and being in contact with the piston for being actuated to move outwardly at the opening of said cover member.

2. A pressure gauge as in claim 1, wherein said graduated bar means has longitudinal opposed ridges adaptable to slide within the guide slots.

3. A pressure gauge as claimed in claim 1, wherein said frame is of a substantially U-shaped configuration

* * * * *